United States Patent [19]

Schiessl et al.

[11] 3,962,113

[45] June 8, 1976

[54] METHOD FOR ACCELERATING OXYGEN REMOVAL EMPLOYING AN AQUEOUS SOLUTION OF AN ALKYL HYDRAZINE

[75] Inventors: Henry W. Schiessl, Northford; John D. Kaufman, Prospect, both of Conn.

[73] Assignee: Olin Corporation, New Haven, Conn.

[22] Filed: Apr. 15, 1974

[21] Appl. No.: 460,844

Related U.S. Application Data

[63] Continuation-in-part of Ser. No. 318,286, Dec. 26, 1972, abandoned.

[52] U.S. Cl................................. 252/188; 423/219; 423/407
[51] Int. Cl.²........................................... C09K 3/00
[58] Field of Search ............ 252/188; 423/219, 407

[56] References Cited
UNITED STATES PATENTS

| | | | |
|---|---|---|---|
| 3,620,694 | 11/1971 | Posey | 252/188 X |
| 3,843,547 | 10/1974 | Kaufman et al. | 252/188 X |

*Primary Examiner*—Stephen J. Lechert, Jr.
*Attorney, Agent, or Firm*—James B. Haglind; Donald F. Clements; T. P. O'Day

[57] ABSTRACT

The rapid removal of dissolved oxygen from aqueous solutions is accomplished by treating the solution with an effective proportion of a liquid organic hydrazine compound. The method of this invention is particularly useful in the removal of dissolved oxygen from aqueous solutions such as boiler water, thereby inhibiting corrosion of the metal surfaces of the boiler.

10 Claims, No Drawings

METHOD FOR ACCELERATING OXYGEN REMOVAL EMPLOYING AN AQUEOUS SOLUTION OF AN ALKYL HYDRAZINE

This application is a continuation-in-part of copending application Ser. No. 318,286, filed Dec. 26, 1972, now abandoned.

This invention relates to a process useful for the rapid removal of oxygen from liquids or gases.

It is known to use hydrazine and its inorganic derivitives for the removal of oxygen from gases and liquids to inhibit or to reduce corrosion of metal surfaces. Commercially important is the use of hydrazine and its inorganic salts in the treatment of water used in boilers and hot-water heating systems to inhibit or reduce corrosion. The general explanation given for the effect of the hydrazine compounds in these applications is that it combines with oxygen present or dissolved in the material being treated according to the equation:

$$N_2H_4 + O_2 \rightarrow N_2 + 2H_2O$$

The rate of reaction of the hydrazine compound with oxygen at ambient or low temperatures for example, below 60°C., is slow. It has therefore been proposed to add oxygen removal acceleration agents to increase the rates at which oxygen combines with the hydrazine compound at lower temperatures. U.S. Pat. No. 3,645,896, issued on Feb. 29, 1972, to A. L. Larsen adds an imidazoline compound to hydrazine for oxygen removal in water-injection type oil wells. U.S. Pat. No. 3,551,349, issued on Dec. 29, 1970 to H. Kallfass adds water soluble quinone compounds to aqueous solutions of hydrazine as activaters in removing oxygen from water solutions. U.S. Pat. No. 3,728,281 issued on Apr. 17, 1973 to C. E. Marks et al incorporates pyrazolidones and/or mono- or polyamino phenols as oxygen removal accelerators with hydrazine in water solutions.

Even where hydrazine has been combined with an oxygen removal acceleration agent to increase the rate of oxygen removal, it has been found that their addition to aqueous solutions at certain pH concentrations has little or no effect on increasing the rates of oxygen removal.

Also known for this purpose is the use of solid organic hydrazine derivitives which can be made in the form of a pellet or tablet as disclosed in U.S. Pat. No. 2,936,289 issued May 10, 1960, to R. C. Harshman and R. L. Holbrook.

Tableted materials must be dissolved in a liquid in order to release the organic hydrazine component required. It is difficult to control the dissolution of tableted or pelleted materials to provide the carefully controlled concentrations required, for example, in the removal of oxygen from boiler waters. In addition, the incorporation of binding agents or solubility enhancing additives required to produce the tablet introduce foreign materials into the solution in addition to the desired hydrazine compound. These foreign materials are at best difficult to remove from the solution and may even be incompatible with other required additives in the solution.

There is a need for hydrazine compounds which significantly increase the rate of oxygen removal from oxygen-containing materials, and which can be used directly without the addition of an oxygen removal accelerating agent. In addition, there is a need for hydrazine compounds which effectively remove oxygen from solutions at pH concentrations where hydrazine or hydrazine mixed with an oxygen acceleration additive is inactive.

It is a primary object of the present invention to provide a method of rapidly removing oxygen from oxygen-containing materials.

It is a further object of this invention to provide a novel method for inhibiting corrosion or degradation of metals by rapidly removing oxygen from oxygen-containing materials in contact with said metals.

Another object of the present invention is to provide a novel method for the rapid removal of oxygen from aqueous solutions in contact with metal surfaces.

These and other objects of the invention will be apparent from the following detailed description of the invention.

It has now been discovered that the aforesaid objects are accomplished by mixing an aqueous solution of an organic hydrazine compound with an oxygen-containing material. When this aqueous solution of an organic hydrazine compound is mixed in an effective proportion with the oxygen-containing material a rapid removal of oxygen therefrom is effected and corrosion of metal surfaces in contact with the thus treated oxygen-containing material is inhibited.

More in detail, the organic hydrazine compound is a liquid selected from the group consisting of monoalkyl hydrazines wherein the alkyl contains from 1 to about 10 carbon atoms, and preferably from 1 to about 6 carbon atoms, dialkyl hydrazines wherein the alkyl contains 1 to about 8 carbon atoms, and preferably from 1 to about 4 carbon atoms, and trialkyl hydrazine compounds wherein the alkyl contains from 1 to about 4 carbon atoms. Further, these organic hydrazine compounds may be substituted on the alkyl group with substituents selected from the group consisting of hydroxyl and amino radicals.

Suitable examples of monoalkyl hydrazines include methyl hydrazine, ethyl hydrazine, 2-hydroxyethyl hydrazine, 2-aminoethyl hydrazine, propyl hydrazine, butyl hydrazine, pentyl hydrazine, hexyl hydrazine, heptyl hydrazine, octyl hydrazine, nonyl hydrazine, decyl hydrazine, and mixtures thereof.

Typical examples of dialkyl hydrazine compounds include 1,1-dimethyl hydrazine, 1,2-dimethyl hydrazine, 1-ethyl-2-methyl hydrazine, 1-ethyl-1-methyl hydrazine, 1,1-diethyl hydrazine, 1,2-diethyl hydrazine, 1-ethyl-2-propyl hydrazine, 1-ethyl-1-isopropyl hydrazine, 1,1-dipropyl hydrazine, 1,2-dipropyl hydrazine, 1,1-diisopropyl hydrazine, 1,2-diisopropyl hydrazine, 1-sec-butyl-1-ethyl hydrazine, 1-butyl-1-methyl hydrazine, 1,1-dibutyl hydrazine, 1,2-dibutyl hydrazine, 1,1-diamyl hydrazine, 1,2-diamyl hydrazine, 1-t-butyl-1-ethyl hydrazine, 1,1-di-t-butyl hydrazine, 1,1-dipentyl hydrazine, 1,2-dipentyl hydrazine, 1,1-dihexyl hydrazine, 1,2-dihexyl hydrazine, 1,2-bis(2-ethylhexyl) hydrazine, 1-ethyl-1-heptyl hydrazine, 1,1-diheptyl hydrazine, 1,2-diheptyl hydrazine, 1,1-dioctyl hydrazine, 1-(2-aminoethyl)-1-methyl hydrazine, 1,1-bis(2-aminoethyl) hydrazine, mixtures thereof and the like.

Suitable examples of trialkyl hydrazines include 1,1-dimethyl-2-ethyl hydrazine, 1,1,2-trimethyl hydrazine, 1,2-di-t-butyl-1-methyl hydrazine, 1,1,2-triethyl hydrazine, and 1,1,2-tripropyl hydrazine, mixtures thereof and the like.

The organic hydrazine compounds employed in the method of the present invention are known compounds which can be prepared, for example, by the methods for monoalkylhydrazines described by A. N. Kost and R. S. Sagitullin in Russ. Chem. Review 33, 159–176 (1964); for dialkyl hydrazines by R. Ohme and H. Preuschhof in Justus Liebigs Ann. Chem. 713, 774–86 (1968); and for trialkylhydrazines by H. Sidi in U.S. Pat. No. 3,517,064, issued June 23, 1970.

The organic hydrazine compound is used in an effective proportion in the novel method of this invention to remove oxygen from an oxygen-containing material. An oxygen-containing material is a liquid or gas containing free oxygen admixed therewith or dissolved therein. Because of the wide range of molecular weights of the organic hydrazine compounds suitable for use with the method of the present invention, it is preferred to express the effective proportion of organic hydrazine compound employed in terms of the equivalent weight of hydrazine required. Generally when the oxygen-containing material to be treated by the novel method of this invention is a liquid, an effective proportion of the organic hydrazine compound is an amount, when added to the liquid, sufficient to maintain a residual organic hydrazine concentration in the liquid corresponding to a hydrazine equivalent of from about 0.01 to about 1000 and preferably from about 0.1 to about 500 parts per million parts of liquid. That is, the weight of organic hydrazine compound added corresponds to the equivalent weight of hydrazine required to remove free or dissolved oxygen from the liquid and provide the desired residual amount. Greater proportions may be employed if desired. These proportions have been found to be effective for example, in the treatment of boiler water in a boiler operated at pressures up to about 3000 psia and at temperatures ranging from about 25°C to about 375°C. However, the same proportion may be used in refrigeration systems at a temperature of about 25°C down to about 0°C or less.

In the novel method of this invention an effective proportion of the organic hydrazine is admixed with the oxygen-containing material by any suitable mixing technique such as mechanical agitation or the like in order to maintain the oxygen concentration at a low level. For example, at room temperature and pressure a boiler water solution saturated with oxygen in an atmosphere of air contains about 8 to 9 parts of oxygen per million. This boiler water solution may be treated by the novel method of the invention to reduce the oxygen concentration to a range of about 1 to about 10 parts per billion at operating conditions.

When the oxygen-containing material being reacted is a gas such as ammonia, hydrogen or other gases inert to the organic hydrazine compound, oxygen reduction and/or removal from the gas can be obtained by scrubbing the oxygen-containing gas by the novel method of this invention using the organic hydrazine compounds in the effective proportions defined above. Scrubbing of the gas can be effected in a suitable scrubber, preferably where the oxygen-containing gas, in finely divided form, is dispersed in the organic hydrazine compound solution.

Removal of oxygen from a liquid or gas using the novel method of this invention provides an oxygen-free liquid or gas which may be contacted with metal surfaces in boilers, ducts, pipes and the like, without corrosion of these metal surfaces caused by free oxygen being present in the liquids or gas.

The organic hydrazine compounds used in the method of the present invention are liquids under standard temperature and pressure conditions. Therefor, when the oxygen-containing material to be treated is a liquid the organic hydrazine compound may be added directly. However, because relatively minor amounts of organic hydrazine compounds are required to remove oxygen from a liquid, it may be preferable to add the organic hydrazine compound as an aqueous solution having a concentration from about 5 to about 65 percent and preferably from about 15 to about 50 percent by weight of organic hydrazine compound.

The novel method of the present invention is used, for example, not only to remove free oxygen from liquids such as water solutions used in boilers but also in hot water system, oil wells using water injection systems, solutions of glycol ethers, heterocyclic oxygen-containing compounds such as furan or sodium dibutyl dithiocarbamate, and the like. Effective control of the oxygen content of these liquids is obtained by admixing the organic hydrazine compound with the oxygen-containing solution in the proportions described above. Since organic hydrazine compound is consumed during oxygen removal, the concentration of the treated liquid should be determined periodically and organic hydrazine compound should be added to the treated liquid in order to maintain the concentration of organic hydrazine in the liquid within the above-defined proportions.

Surprisingly, the organic hydrazine compounds used in the novel method of the present invention significantly increase the rate of oxygen removal over that of hydrazine. Further, the organic hydrazine compounds are highly effective oxygen removal agents in aqueous solutions at acid and neutral pH conditions where hydrazine is ineffective. Depending on the particular organic hydrazine compound employed, free or dissolved oxygen may be effectively removed in aqueous solutions at a pH range of from about 2 to about 12, preferably at a pH range of about 3 to about 10 and more preferably at a pH range of about 3 to about 8. For example, monomethyl hydrazine is highly effective in oxygen removal from aqueous solutions at a pH of from about 2 to about 12 while the preferred range for 2-hydroxyethyl hydrazine is a pH of from about 2 to about 8. The effective range for 1,1-dimethyl hydrazine is a pH of from about 2 to about 9. Employment of the novel method of the present invention with acidic or neutral solutions provides effective removal of free or dissolved oxygen without the need for adding a base to adjust the pH of the solution to where hydrazine could be used effectively to remove oxygen.

The following examples are presented to further illustrate the invention without any intention of being limited thereby. All parts and percentages are by weight unless otherwise specified.

EXAMPLE 1

Water was saturated with oxygen at a temperature of 25°C. and buffered to a pH of seven with a 0.2 molar solution of monobasic potassium phosphate containing sodium hydroxide, and potassium chloride. Nine parts by volume of this solution was then mixed with one part by volume of an aqueous solution containing 1,500 parts per million of methyl hydrazine to give an aqueous solution containing 150 parts per million of methyl hydrazine. Oxygen removal was determined by a polarographic method over a period of about ten minutes. The results for the percent of oxygen removed after intervals of 2, 4, 6, 8, and 10 minutes are given in Table 1.

For purposes of comparison the procedure of Example 1 was repeated except that an aqueous solution containing hydrazine was substituted for the aqueous solution containing methyl hydrazine. The percent of oxygen removed was determined after intervals of two, four, six, eight and ten minutes and the results are presented below in Table 1 under example C1.

EXAMPLE 2

The procedure of Example 1 was repeated using water saturated with oxygen at a temperature of 25°C. and buffered to a pH of ten with a 0.2 molar solution of boric acid containing sodium hydroxide, and potassium chloride. Oxygen removal was determined by a polarographic method over a period of about 10 minutes. The results for the percent of oxygen removal after intervals of 2, 4, 6, 8, and 10 minutes are given in Table 1.

For purposes of comparison the procedure of Example 2 was repeated as comparative Example C-2 using a solution containing hydrazine in place of the solution containing methylhydrazine. The percent of oxygen removed was determined after the same intervals as in Example 2 and the results are presented in Table 1 below.

EXAMPLE 3

The procedure of Example 1 was repeated employing 2-hydroxyethyl hydrazine as the organic hydrazine compound. Water was saturated with oxygen at 25°C. and buffered to a pH of 4.9 with a 0.2 molar solution of acetic acid containing sodium acetate and potassium chloride. Oxygen removal was determined over a period of six minutes in which time the 2-hydroxyethyl hydrazine effectively removed 98% of the free $O_2$ present.

For purposes of comparison, the procedure of Example 3 was repeated as comparative Example C-3 using a solution containing hydrazine. Essentially no oxygen was removed by hydrazine at a pH of 4.9 in the six minute time period.

The results of Example 3 and comparative Example C-3 are given in Table 1 below.

EXAMPLE 4

Example 3 was repeated substituting 1,1-dimethyl hydrazine for 2-hydroxyethyl hydrazine in water saturated with $O_2$ at 25°C. and buffered to a pH of 4.9. The results are shown in Table 1 below.

EXAMPLE 5

Example 1 was repeated using 1,1-dimethyl hydrazine in place of monomethyl hydrazine in water saturated with $O_2$ at 25°C. and buffered to a pH of 7. The results are shown in Table I below.

The results shown in Table 1 effectively illustrate the superior oxygen removal properties of the organic hydrazine compounds employed in the novel method of the present invention over those of hydrazine. This is particularly true in aqueous solutions at acidic or neutral pH ranges where hydrazine is for the most part ineffective for the rapid removal of free or dissolved oxygen.

Using the organic hydrazine compounds in the present invention, the necessity for adding other agents to hydrazine is eliminated since the organic hydrazine compounds provide greatly increased rates of $O_2$ removal when employed by themselves alone.

What is claimed is:

1. A method for removing oxygen from an oxygen-containing material which comprises admixing said oxygen-containing material with a liquid organic hydrazine compound selected from the group consisting of monoalkyl hydrazines wherein the alkyl contains from 1 to about 10 carbon atoms, dialkyl hydrazine wherein alkyl contains from 1 to about 8 carbon atoms, and trialkyl hydrazines wherein the alkyl contains from 1 to about 4 carbon atoms, and having substituents in said alkyl selected from the group consisting of hydroxyl and amino radicals, in which said organic hydrazine compound is present in an amount sufficient to remove said oxygen and maintain a residual organic hydrazine concentration corresponding to a hydrazine equivalent weight of from about 0.01 to about 1000 parts per million.

2. The method of claim 1 in which said organic hydrazine compound is monoalkyl hydrazine.

3. The method of claim 2 in which said monoalkyl hydrazine is methyl hydrazine.

4. The method of claim 2 in which said monoalkyl hydrazine is hydroxyethyl hydrazine.

5. The method of claim 1 in which said organic hydrazine compound is a dialkyl hydrazine.

6. The method of claim 5 in which said dialkyl hydrazine is selected from the group consisting of 1,1-dimethyl hydrazine or 1,2-dimethyl hydrazine.

7. The method of claim 1 in which said oxygen-containing material is an aqueous solution containing said organic hydrazine compound in an amount sufficient to maintain a residual organic hydrazine concentration corresponding to a hydrazine equivalent weight of from about 0.1 to about 500 parts per million.

8. The method of claim 7 in which said oxygen-containing material is water.

9. The method of claim 8 in which the pH of said water is from about 3 to about 8.

10. The method of claim 1 in which said organic hydrazine compound is an aqueous solution having a concentration of from about 5 to about 65 percent by weight of said organic hydrazine compound.

* * * * *

TABLE I

Percent Oxygen Removed from Aqueous Solutions Containing 150 ppm of a Hydrazine Compound at 25°C.

| Example No. | Hydrazine Compound | Solution pH | Percent Oxygen Removed After | | | | |
|---|---|---|---|---|---|---|---|
| | | | 2 min. | 4 min. | 6 min | 8 min | 10 min |
| 1 | Methyl Hydrazine | 7.0 | 22 | 39 | 60 | 86 | 97 |
| 2 | Methyl Hydrazine | 10.0 | 20 | 32 | 43 | 52 | 61 |
| 3 | 2-Hydroxyethyl hydrazine | 4.9 | 40 | 80 | 98 | | |
| 4 | 1,1-Dimethyl hydrazine | 4.9 | 21 | 34 | 50 | 65 | 79 |
| 5 | 1,1-Dimethyl hydrazine | 7.0 | 24 | 39 | 56 | 72 | 82 |
| C1 | Hydrazine | 7.0 | 11 | 16 | 18 | 21 | 24 |
| C2 | Hydrazine | 10.0 | 14 | 20 | 25 | 30 | 36 |
| C3 | Hydrazine | 4.9 | 0 | 0 | 0 | | |